(12) United States Patent
Maidee

(10) Patent No.: US 11,886,854 B1
(45) Date of Patent: Jan. 30, 2024

(54) ACCELERATION-READY PROGRAM DEVELOPMENT AND DEPLOYMENT FOR COMPUTER SYSTEMS AND HARDWARE ACCELERATION

(71) Applicant: Xilinx, Inc., San Jose, CA (US)

(72) Inventor: Pongstorn Maidee, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 267 days.

(21) Appl. No.: 17/363,920

(22) Filed: Jun. 30, 2021

(51) Int. Cl.
  *G06F 8/61* (2018.01)
  *G06F 9/448* (2018.01)
  *G06F 9/445* (2018.01)

(52) U.S. Cl.
  CPC .............. *G06F 8/61* (2013.01); *G06F 9/4494* (2018.02); *G06F 9/44521* (2013.01); *G06F 9/44536* (2013.01)

(58) Field of Classification Search
  None
  See application file for complete search history.

(56) References Cited

U.S. PATENT DOCUMENTS

| | | |
|---|---|---|
| 10,586,003 B1 | 3/2020 | Suresh |
| 10,755,013 B1 | 8/2020 | Fang et al. |
| 10,762,265 B1 | 9/2020 | Fang et al. |
| 2012/0096445 A1* | 4/2012 | Berg .................. G06F 9/44547 717/140 |
| 2014/0143570 A1* | 5/2014 | Bose ...................... G06F 1/324 713/323 |
| 2015/0293774 A1* | 10/2015 | Persson ............... G06F 9/45558 718/1 |
| 2022/0237014 A1* | 7/2022 | Kurkure ................... G06T 1/20 |

FOREIGN PATENT DOCUMENTS

AU  2019203284 A1 * 5/2019 ............. G06F 21/10

* cited by examiner

*Primary Examiner* — Umut Onat
(74) *Attorney, Agent, or Firm* — Kevin T. Cuenot

(57) ABSTRACT

Acceleration-ready program development includes providing a software library having a plurality of functions having compute identifiers. The software library is associated with a hardware library including one or more hardware accelerated functions. The hardware accelerated functions are associated with the compute identifiers. Each hardware accelerated function is a functional equivalent of a function of the software library having the same compute identifier. A hybrid executor layer is provided that, when executed by a data processing system with an acceleration-ready computer program built using the software library, is configured to initiate execution of a selected function of the acceleration-ready computer program using a processor of the data processing system or invoke a hardware accelerated function having a compute identifier matching the compute identifier of the selected function based on comparing acceleration criteria with acceleration rules.

19 Claims, 9 Drawing Sheets

ACCELERATION-READY PROGRAM DEVELOPMENT AND DEPLOYMENT FOR COMPUTER SYSTEMS AND HARDWARE ACCELERATION

TECHNICAL FIELD

This disclosure relates to the development and deployment of acceleration-ready programs capable of executing on computer systems with hardware acceleration and on computer systems without hardware acceleration.

BACKGROUND

Hardware acceleration generally refers to implementing a particular task in hardware or circuitry in lieu of performing the task using a processor executing program code. In this sense, a "hardware accelerator" may refer to a circuit implementation of computer readable program instructions (e.g., program code). A computer system may include or be coupled to a hardware accelerator. Rather than execute program code on the processor of the computer system to perform the task, the processor instructs the hardware accelerator to perform the task. Hardware acceleration typically provides one or more benefits not attainable through execution of program code using a processor. Examples of these benefits may include faster operation, reduced power consumption, and/or redundancy.

SUMMARY

In one or more example implementations, a method can include providing a software library having a plurality of functions having compute identifiers. The software library is associated with a hardware library including one or more hardware accelerated functions. The hardware accelerated functions are associated with the compute identifiers, and each hardware accelerated function is a functional equivalent of a function of the software library having the same compute identifier. The method can include providing a hybrid executor layer that, when executed by a data processing system with an acceleration-ready computer program built using the software library, is configured to initiate execution of a selected function of the acceleration-ready computer program using a processor of the data processing system or invoke a hardware accelerated function having a compute identifier matching the compute identifier of the selected function based on comparing acceleration criteria with acceleration rules.

In one or more example implementations, a method can include executing, using computer hardware, a computer program built using one or more functions of a software library. The one or more functions of the software library are associated with one or more hardware accelerated functions of a hardware library. The hardware accelerated functions are functionally equivalent to corresponding functions of the plurality of functions of the software library. The method can include, during execution of the computer program, comparing, using the computer hardware, acceleration criteria relating to the computer hardware and the functions of the computer program with acceleration rules. The method also can include initiating execution of a selected function of the computer program using a processor of the computer hardware or invoking a hardware accelerated function that is functionally equivalent to the selected function based on the comparing.

In one or more example implementations, a system includes one or more processors configured to initiate operations. The operations can include executing a computer program built using one or more functions of a software library. The one or more functions of the software library are associated with one or more hardware accelerated functions of a hardware library. The hardware accelerated functions are functionally equivalent to corresponding functions of the plurality of functions of the software library. The operations can include, during execution of the computer program, comparing acceleration criteria relating to computer hardware of the system and the functions of the computer program with acceleration rules. The operations also can include initiating execution of a selected function of the computer program using the one or more processors or invoking a hardware accelerated function that is functionally equivalent to the selected function based on the comparing.

In another aspect, a computer program product includes one or more computer readable storage media, and program instructions collectively stored on the one or more computer readable storage media. The program instructions are executable by computer hardware to initiate the various operations described herein.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
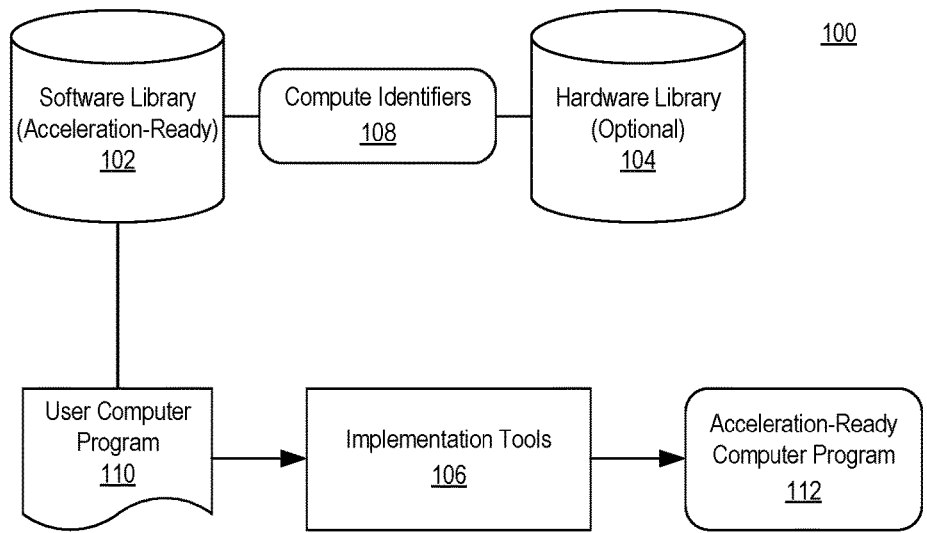
FIG. 1 illustrates an example computing environment for developing an acceleration-ready computer program.

This disclosure relates to the development and deployment of acceleration-ready programs capable of executing on computer systems with hardware acceleration and on computer systems without hardware acceleration. As defined within this disclosure, an acceleration-ready program is a computer program that is capable of executing on a computer system without hardware acceleration and also on a computer system with hardware acceleration without modification to the computer program. When executed by the computer system having hardware acceleration (e.g., having a hardware accelerator), at least a portion of the acceleration-ready program is performed by the hardware accelerator.

Conventional techniques to hardware accelerate a computer program include using an overlay or creating a custom-built accelerator. An overlay is a pre-built circuit design that may be loaded into an IC of a hardware accelerator. The overlay typically includes a software application programming interface (API) that may be accessed by the processor of the computer system. Using an overlay allows the computer program developer to forego the lengthy and complex process of creating a custom circuit design to hardware accelerate one or more functions of the computer program being developed. The design space covered by overlays, however, is only a small subset of the available computer programs that may benefit from hardware acceleration. That is, there are relatively few overlays given the many different functions implemented in software. The other option of creating a custom-built accelerator requires generating a custom circuit design specified in hardware description language that may be processed through a design flow (e.g., synthesis, placement, routing, and/or configuration bitstream generation).

In conventional computer program development, to benefit from hardware acceleration, a computer program must be developed with the intention of using hardware acceleration. The developer of the computer program, as part of the development process, chooses which portions of the computer program are to be executed by the processor of the computer system and which portions of the computer program are to be hardware accelerated. Program code of the computer program executed by the host may be referred to as host program code. Functions, tasks, or program code of the computer program to be hardware accelerated may be referred to as kernels. The host program code must be aware of the existence and availability of a hardware accelerator in order to access the hardware acceleration functionality. Designating some portions of the computer program as host program code and others as kernels adds complexity to the development process, resulting in a limited number of computer programs being hardware accelerated.

In cases where an overlay to hardware accelerate a particular function or function set is not available, one or more kernels may be designed in accordance with several different techniques. In one example, a kernel may be built using a library of pre-designed primitives or higher-level functions. Primitives represent smaller scale circuit functions such as multipliers, adders, and the like, while higher-level functions may be circuit functions that are domain specific such as certain financial forecasting circuits, digital signal processing circuits, or the like. In another example, kernels may be built from high-level programming language source code that is processed using High-Level Synthesis (HLS). In still another example, kernels may be specified directly in a hardware description language. Regardless of the technique used, creating a custom-built accelerator may be a complex and time-consuming process that requires special expertise in hardware development that goes beyond conventional computer programming.

If, after the computer program is developed, a decision is made to hardware accelerate a function of the computer program that was not previously hardware accelerated, the computer program must be re-developed and re-deployed to computer systems in the field. That is, the function that was previously executed by the processor must be converted into a circuit design and integrated with any other kernels that are to be hardware accelerated. Further, the portions of the computer program that will continue to be executed by the processor of the computer system must be re-compiled into object code. The same is true in the reverse. If, after development of the computer program, a hardware accelerated function of the computer program is designated to be a non-hardware accelerated function, the computer program must be re-developed and re-deployed to computer systems in the field. Further, the aforementioned limitations are computer-system specific. That is, the same procedure must be repeated for different computer systems.

In accordance with the inventive arrangements described within this disclosure, a computer program may be developed using a software library. The software library includes one or more accelerable software functions. An accelerable software function is a software function that may be associated with a hardware implementation of that software function. The software library may be paired with a hardware library that includes hardware functions corresponding to the software functions of the software library. That is, the hardware functions in the hardware library are hardware accelerated functions that are functional equivalents of the functions in the software library. This allows each software function from the software library to be paired or matched with a functionally equivalent hardware accelerated function from the hardware library.

The computer program may be developed using the software library. In addition, the computer program may be installed or deployed along with a hybrid executor layer. The hybrid executor layer is capable of executing in the computer system and determining, at runtime of the computer program, whether the software implementation or the hardware accelerated version of the various functions of the computer program will be used. Whether the software or hardware version of a function is used at runtime may depend on whether the computer system includes a hardware accelerator and/or one or more other factors described herein in greater detail below.

The inventive arrangements described herein provide methods, systems, and computer program products directed to various aspects of implementing an acceleration-ready computer program such as building the software library, building the hardware library, writing the acceleration-ready computer program, and executing the acceleration-ready computer program. Once developed, the same acceleration-ready computer program is capable of executing on a computer system without hardware acceleration (having no hardware accelerator) and also on a computer system with hardware acceleration (having a hardware accelerator) where the hardware accelerator is used to perform one or more functions of the acceleration-ready computer program. Further, the determination as to which functions of the acceleration-ready computer program to hardware accelerate may be performed automatically at runtime of the acceleration-ready computer program (e.g., in real-time during execution) rather than during development. The determination of which functions to hardware accelerate at runtime may depend on a variety of different factors that may change from time-to-time.

FIG. 1 illustrates an example computing environment 100 for developing an acceleration-ready computer program. Computing environment 100 may be implemented within, or by, a computer system that is capable of executing program code. An example of a computer system that may be used to implement computing environment 100 is described in connection with FIG. 11 (e.g., computer 1100). As pictured, computing environment 100 includes a software library 102, a hardware library 104, and implementation tools 106.

It should be appreciated that while FIG. 1 depicts one software library and one hardware library, one or more software libraries and/or one or more hardware libraries may be included in computing environment 100. Further, for purposes of developing an acceleration-ready computer program such as acceleration-ready computer program 112, hardware library 104 need not be present or included in computing environment 100. That is, acceleration-ready computer program 112 may be built using software library 102 and compute identifiers (IDs). Hardware library 104 may be added or installed at a later time, e.g., subsequent to development and building of acceleration-ready computer program 112. For this reason, hardware library 104 is annotated in FIG. 1 as being "optional." Hardware library 104 may be added or installed for availability to computing environment 100 at the time that acceleration-ready computer program 112 is executed (e.g., at runtime).

Software library 102 includes one or more functions that may be specified in a computer programming language. The functions may be specified as source code, for example. In one aspect, the functions of software library 102 are specified in a high-level programming language (HLPL).

As defined herein, the term "high-level programming language" or "HLPL" means a programming language, or set of instructions, used to program a data processing system where the instructions have a strong abstraction from the details of the data processing system, e.g., machine language. For example, a high-level programming language may automate or hide aspects of operation of the data processing system such as memory management. The amount of abstraction typically defines how "high-level" the programming language is. Using a high-level programming language frees the user from dealing with registers, memory addresses, and other low-level features of the data processing system upon which the high-level programming language will execute. In this regard, a high-level programming language may include little or no instructions that translate directly, on a one-to-one basis, into a native opcode of a central processing unit (CPU) of a data processing system. Examples of high-level programming languages include, but are not limited to, C, C++, SystemC, OpenCL C, or the like.

Hardware library 104 includes one or more hardware accelerated functions. The hardware accelerated functions may be specified as pre-built circuit designs that may be loaded into a programmable IC of a hardware accelerator. An example hardware accelerator 1150 is described in connection with FIG. 11. An example IC architecture that may be used to implement the IC of the hardware accelerator is described in connection with FIG. 12. As an illustrative and non-limiting example, the hardware accelerated functions may be specified as configuration bitstreams that are loadable within a programmable IC. Loading a circuit design, e.g., a configuration bitstream, physically implements the circuit design within the programmable IC.

Software library 102 is considered "acceleration-ready." The term "acceleration-ready" means that a given function of software library 102 includes a mechanism that allows the function to be linked, or associated with, a functionally equivalent version of the function albeit implemented in hardware as a hardware accelerated function. In one aspect, the mechanism used to create associations between a function and a functionally equivalent hardware accelerated function is a compute identifier (ID). One or more or all functions of software library 102 may be associated with respective functionally equivalent hardware accelerated functions via compute IDs 108.

In one aspect, a compute ID may be specified as one or more alphanumeric characters. In another aspect, a compute ID may be a signature generated from the software function. For example, the signature may be a hash of the software function.

In an example implementation, each function of software library 102 has or includes a compute ID 108. A function of software library 102 and a hardware accelerated function of hardware library 104 that have a same compute ID 108 are functionally equivalent to one another. Thus, the existence of a compute ID for a software functions signifies or indicates that the software function may have a functionally equivalent hardware function available in hardware library 104 or another hardware library.

In the example of FIG. 1, a user is capable of writing or otherwise creating a user computer program 110 using software library 102. That is, user computer program 110 will be written or created to include one or more functions from software library 102. User computer program 110 may be processed using implementation tools 106. Implementation tools 106 may include a compiler that is capable of generating object code. Further, implementation tools 106 may include a linker. Implementation tools 106 operate on user computer program 110 to generate acceleration-ready computer program 112. Acceleration-ready computer program 112 may be executed by a processor of a data processing system such as computer 1100, whether or not a hardware accelerator is coupled to the data processing system.

Figure 2:
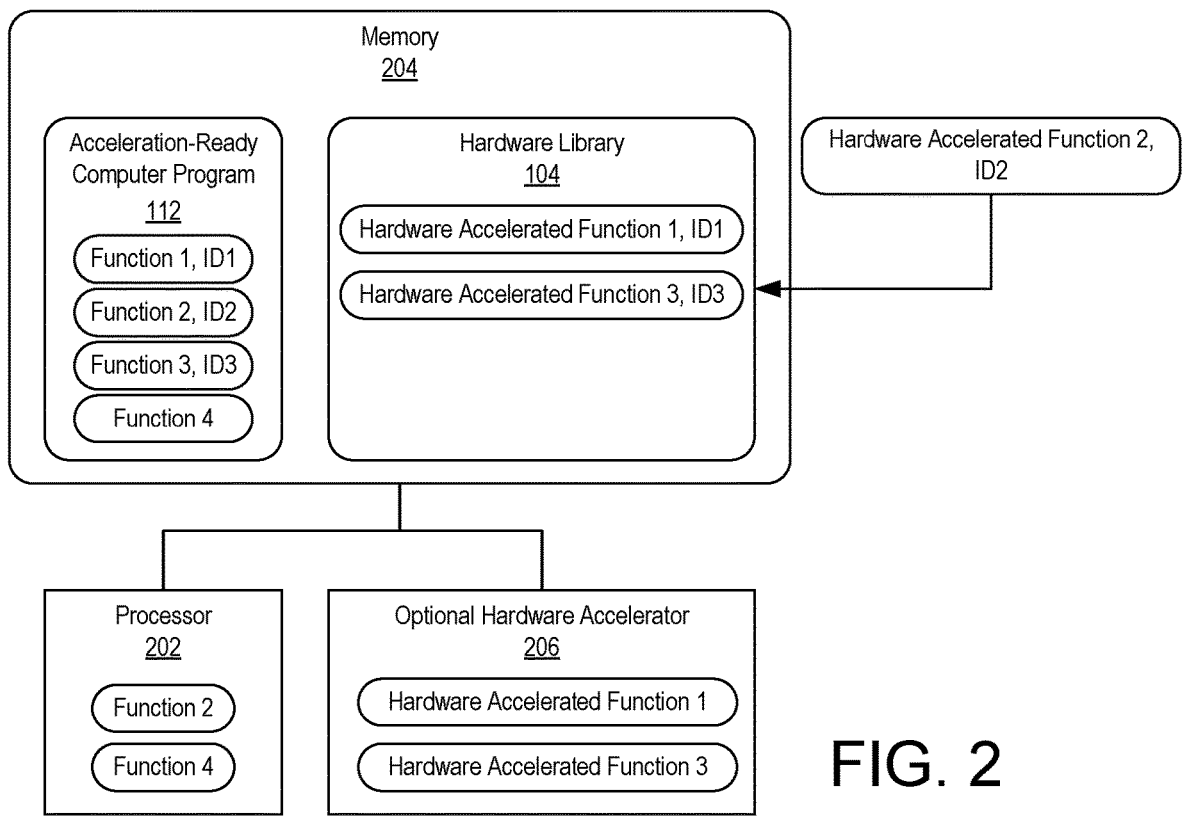
FIG. 2 illustrates an example of a data processing system executing an acceleration-ready computer program.

FIG. 2 illustrates an example of a data processing system executing acceleration-ready computer program 112 of FIG. 1. In the example of FIG. 2, the data processing system includes a processor 202, a memory 204, and an optional hardware accelerator 206. Acceleration-ready computer program 112 includes functions 1, 2, 3, and 4. For purposes of discussion, each of functions 1, 2, and 3 are from software library 102. As shown, each of functions 1, 2, and 3 has, or includes, a compute ID shown as ID1, ID2, and ID3, respectively. Function 4 is not from software library 102 and correspondingly has no computer ID.

The data processing system also includes hardware library 104. Hardware library 104 may be stored in the same memory 204 of the data processing system as acceleration-ready computer program 112 or in a different memory or data storage device that is communicatively linked with the data processing system. For purposes of illustration, hardware library 104 includes hardware accelerated functions 1 and 3. As may be observed from the matching compute IDs, hardware accelerated function 1 of hardware library 104 is a functional equivalent of function 1 of acceleration-ready computer program 112. Similarly, hardware accelerated function 3 of hardware library 104 is a functional equivalent of function 3 of acceleration-ready computer program 112. Function 2 has a compute ID of ID2. Though function 2 of acceleration-ready computer program 112 is from software library 102, hardware library 104 currently (e.g., at the time of execution of acceleration-ready computer program 112) does not include a functionally equivalent hardware accelerated function for function 2.

In one aspect, consider the case where the data processing system does include optional hardware accelerator 206. In that case, processor 202 is used to execute those functions of acceleration-ready computer program 112 that do not have functional equivalents in hardware library 104 and/or do not have a compute ID. Those functions that do have functional equivalents in hardware library 104 are not executed by processor 202. Rather, in the general case, functions of acceleration-ready computer program 112 with functionally equivalent hardware accelerated functions from hardware library 104 are implemented using optional hardware accelerator 206. In other example implementations, the decision to use a functionally equivalent hardware accelerated function in place of a software function may depend on additional acceleration criteria and/or acceleration rules. Thus, in the example of FIG. 2, processor 202 executes functions 2 and 4 of acceleration-ready computer program 112. Functions 1 and 3 are not executed by processor 202. Instead, hardware accelerated function 1 and hardware accelerated function 3 are executed by optional hardware accelerator 206. Hardware accelerated function 1 and hardware accelerated function 3 may be executed by optional hardware accelerator 206 serially or in parallel (e.g., concurrently).

The example of FIG. 2 also illustrates that hardware library 104 may be updated from time-to-time to include one or more additional hardware accelerated functions. For example, acceleration-ready computer program 112 may be installed in the data processing system. Subsequent to installation, without any modification to acceleration-ready computer program 112, hardware accelerated function 2 may be added to hardware library 104. Because function 2 already had, or included, a compute ID of ID2, addition of a hardware accelerated function in hardware library 104 also having a compute ID of ID2 means that hardware accelerated function 2 is determined to be functionally equivalent to function 2 of acceleration-ready computer program 112.

Thus, hardware accelerated functions may be continually added to hardware library 104 over time. Accordingly, though installed in a data processing system, acceleration-ready computer program 112 may continue to benefit from inclusion of additional hardware accelerated functions to hardware library 104 over time. This means that a greater portion of acceleration-ready computer program 112 may become hardware accelerated over time as new hardware accelerated functions are added to hardware library 104 without any modification to acceleration-ready computer program 112. Similarly, a lesser portion of acceleration-ready computer program 112 may become hardware accelerated over time if hardware accelerated functions are removed from hardware library 104. Hardware accelerated functions may also be updated over time to fix bugs or be replaced with more efficient versions over time without having to re-implement accelerator-ready computer program 112. The decision as to whether to hardware accelerate a given function of acceleration-ready computer program 112 may be made automatically during runtime (e.g., when acceleration-ready computer program 112 is executed).

Figure 3:
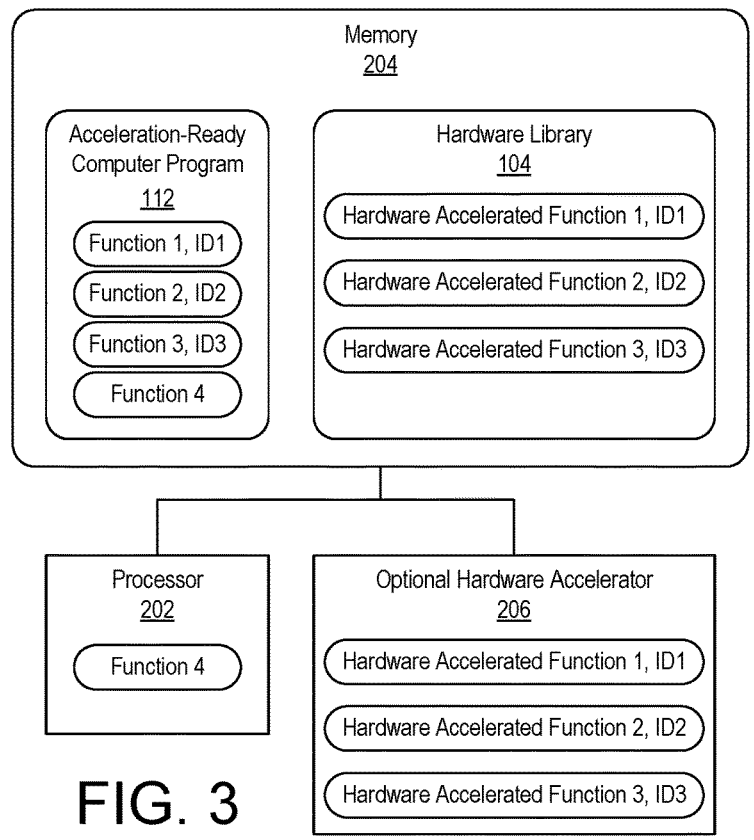
FIG. 3 illustrates another example of the data processing system of FIG. 2 where hardware accelerated function 2 has been added to the hardware library.

FIG. 3 illustrates another example of the data processing system of FIG. 2 where hardware accelerated function 2 has been added to hardware library 104. Hardware accelerated function 2 has been added to hardware library 104, for example, subsequent to installation of acceleration-ready computer program 112 in the data processing system. When acceleration-ready computer program 112 is executed, processor 202 executes function 4 and does not execute functions 1, 2, or 3. Rather, optional hardware accelerator 206 executes hardware accelerated functions 1, 2, and 3, whether serially or in parallel in various combinations. Again, the decision whether to hardware accelerate any function is performed at runtime.

Figure 4:
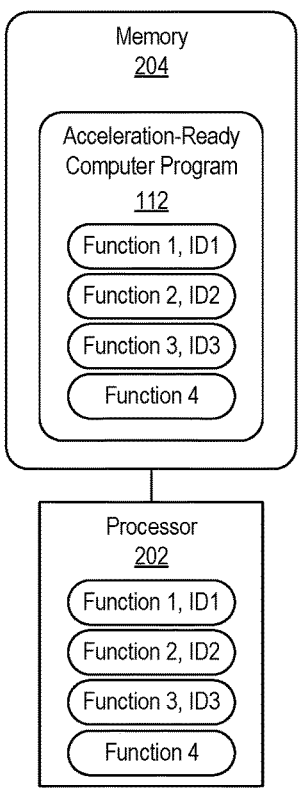
FIG. 4 illustrates another example of the data processing system of FIG. 2 where optional hardware accelerator is omitted.

FIG. 4 illustrates another example of the data processing system of FIG. 2 where optional hardware accelerator 206 is omitted. In that case, processor 202 is used to execute each function of acceleration-ready computer program 112 regardless of whether the function has a compute ID and/or a functional equivalent in hardware library 104. Further, as illustrated, in cases where the data processing system does not have a hardware accelerator, hardware library 104 need not be installed. Thus, processor 202 executes functions 1, 2, 3, and 4. Again, the decision whether to hardware accelerate any function is performed at runtime.

The examples of FIGS. 2-4 illustrate different scenarios where the presence or availability of a hardware accelerator in the data processing system, in combination with whether the function has a compute ID and the availability of a functionally equivalent hardware accelerated function, determines, whether the function is executed by the processor of the data processing system or whether the hardware accelerator is used.

The availability of a hardware accelerator in the data processing system, whether a function has a compute ID, and whether the compute ID matches a compute ID of a hardware accelerated function of the hardware library 104 are examples of acceleration criteria that may be determined at runtime. The acceleration criteria may be compared with acceleration rules at runtime to determine whether to hardware accelerate any given function. Examples of the acceleration rules may include:

Execute a function using the processor of the data processing system if no hardware accelerator is installed in the data processing system.

Execute a function without a compute ID using the processor of the data processing system.

Execute a function with a compute ID that does not have a functional equivalent hardware accelerated function in the hardware library using the processor of the data processing system.

Initiate hardware acceleration of a function if a hardware accelerator is installed in the data processing system and the function has a compute ID that matches a compute ID of a hardware accelerated function. In that case, initiate hardware acceleration by invoking the hardware accelerated function with the matching compute ID.

It should be appreciated that the acceleration criteria and the acceleration rules may also address one or more other factors to determine whether to perform a function using a processor or a hardware accelerator.

Figure 5:
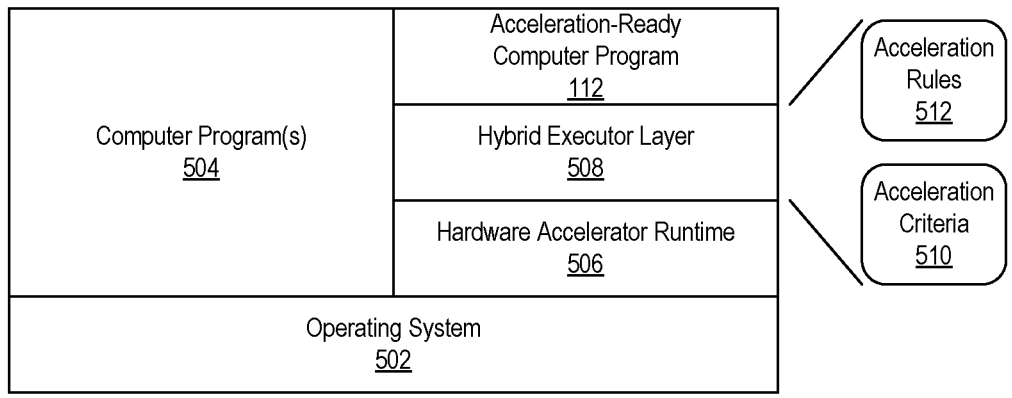
FIG. 5 illustrates an example software stack for an acceleration-ready computer program.

FIG. 5 illustrates an example software stack for an acceleration-ready computer program. The example software stack of FIG. 5 may be executed by a data processing system as described herein. As illustrated, the software stack may include an operating system 502, one or more computer programs 504 that are not considered acceleration-ready, a hardware accelerator runtime 506, a hybrid executor layer 508, and one or more acceleration-ready computer program(s) 112. In the example of FIG. 5, hardware accelerator runtime 506 and hybrid executor layer 508 are not considered part of operating system 502. Further, hybrid executor layer 508 may determine acceleration criteria 510 and include acceleration rules 512. Hybrid executor layer 508 may perform the comparing of acceleration criteria 510 with acceleration rules 512.

As illustrated in the example of FIG. 5, computer programs 504 execute directly under control, or by, operating system 502. Acceleration-ready computer program 112 executes in coordination with a hybrid executor layer 508. Hybrid executor layer 508 may execute in coordination with hardware accelerator runtime 506.

In one aspect, creation of acceleration-ready computer program 112 may include generating a task graph that describes software functions. For example a compiler may generate the task graph. The task graph may indicate each of the functions of acceleration-ready computer program 112 and the dependencies of the functions. The dependencies indicate which functions generate data as input for other functions. The task graph may also list the compute ID of each function if such function has a compute ID. The task graph may be provided to, or registered with, hybrid executor layer 508 for use in determining information such as function dependencies and/or whether a given function of acceleration-ready computer program 112 should be executed in software (e.g., using the processor) or in hardware (using the hardware accelerator).

In a parallel programming paradigm, interaction among functions can be described as a task graph to depict function dependencies. A parallel programming software platform is capable of using the task graph to decide which functions can run in parallel. For an acceleration-ready computer program, the dependencies are also useful to decide which functions should be run on the hardware accelerator. If function A, for example, has a compute ID, takes input from other functions without a compute ID, and provides output to other functions without a compute ID, function A may be executed by the processor of the data processing system in cases where the execution time of function A is short (e.g., less than some threshold amount of time). In an example, the threshold amount of time may be the sum of the amount of time needed to transfer the input data for function A from the data processing system to the hardware accelerator and the time needed to transfer the output data from function A from the hardware accelerator to the data processing system.

In one aspect, the execution time of the functions of acceleration-ready computer program 112 may be specified, e.g., as determined at compile time, in the task graph or as metadata stored elsewhere, e.g., in a different file, within the data processing system. In another example implementation, hybrid executor layer 508 may be embedded in a parallel programming software platform. As such, hybrid executor layer 508 would have access to the function dependencies and any other information that may be annotated onto the task graph such as the data transfer times for the various functions.

Hardware accelerator runtime 506 is program code executed by a data processing system that facilitates communication with a hardware accelerator. For example, hardware accelerator runtime 506 may include the driver(s) necessary to communicate with and control a hardware accelerator communicatively linked to the data processing system. In an example implementation, hardware accelerator runtime may be installed with the installation or addition of the hardware accelerator to the data processing system. That is, if the data processing system does not include a hardware accelerator, hardware accelerator runtime 506 need not be installed or included in the software stack.

Hybrid executor layer 508 provides support functionality to acceleration-ready computer program 112. In one aspect, hybrid executor layer 508 is capable of interacting with operating system 502 on behalf of acceleration-ready computer program 112. Further, in cases where hardware accelerator runtime 506 is installed in the software stack, hybrid executor layer functions as a communication layer that bridges communications, or facilitates communication, between acceleration-ready computer program 112 and hardware accelerator runtime 506.

As an illustrative and non-limiting example, hybrid executor layer 508 is capable of determining acceleration criteria 510 and comparing acceleration criteria 510 with acceleration rules 512 as described herein to determine whether a function from acceleration-ready computer program 112 should be executed by processor 202 or whether to invoke the hardware accelerator via hardware accelerator runtime 506. Operation of hybrid executor layer 508 is described in greater detail in connection with FIG. 10.

Figure 6:
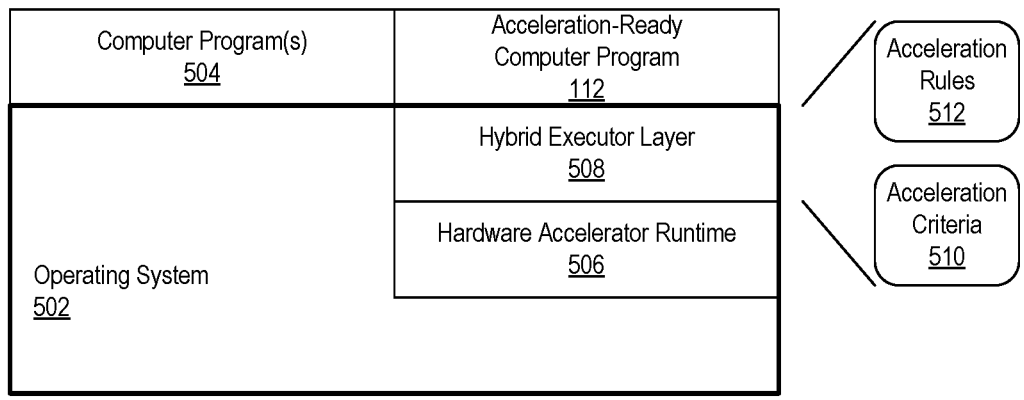
FIG. 6 illustrates another example software stack for an acceleration-ready computer program.

FIG. 6 illustrates another example software stack for an acceleration-ready computer program. The example of FIG. 6 is substantially similar to the example of FIG. 5. In the example of FIG. 6, however, hardware accelerator runtime 506 and hybrid executor layer 508 are considered part of operating system 502. Further, in cases where the data processing system does not include a hardware accelerator, hardware accelerator runtime 506 may still be included in operating system 502. Operation of hybrid executor layer 508 is described in greater detail in connection with FIG. 10.

In one or more example implementations, two or more different versions of hybrid executor layer 508 may be implemented. A lightweight version of hybrid executor layer 508 may be installed in the data processing system in cases where a hardware accelerator is not yet available or installed. The lightweight version may include a reduced set of functions since a variety of acceleration criteria need not be determined or evaluated. Further, communication with hardware accelerator runtime 506 is not required or only requires that hybrid executor layer 508 have sufficient functionality to determine that a hardware accelerator is not available (e.g., not installed for the data processing system). Upon installation of the hardware accelerator or upon installation of hardware accelerator runtime 506, for example, a different version of hybrid executor layer 508 may be installed that includes full functionality. Alternatively, the functionality lacking from the lightweight version of the hybrid executor layer 508 may be installed or added at that time.

In one or more other example implementations, the software stack of FIGS. 5 and/or 6 may include a scheduler. The scheduler may be included as an additional layer between hybrid executor layer 508 and hardware accelerator runtime 506. The scheduler may be included in cases where a hardware accelerator is installed in the data processing system. The scheduler is capable of regulating, or "scheduling," access to the hardware accelerator among multiple different acceleration-ready computer programs if such programs are executing concurrently in the data processing system. The scheduler is capable of controlling and granting access to these different acceleration-ready computer programs in cases where both are attempting to gain access to the same set of hardware resources of the hardware accelerator at the same time. The scheduler is capable of operating in a coordinated manner with hybrid executor layer 508.

Figure 7:
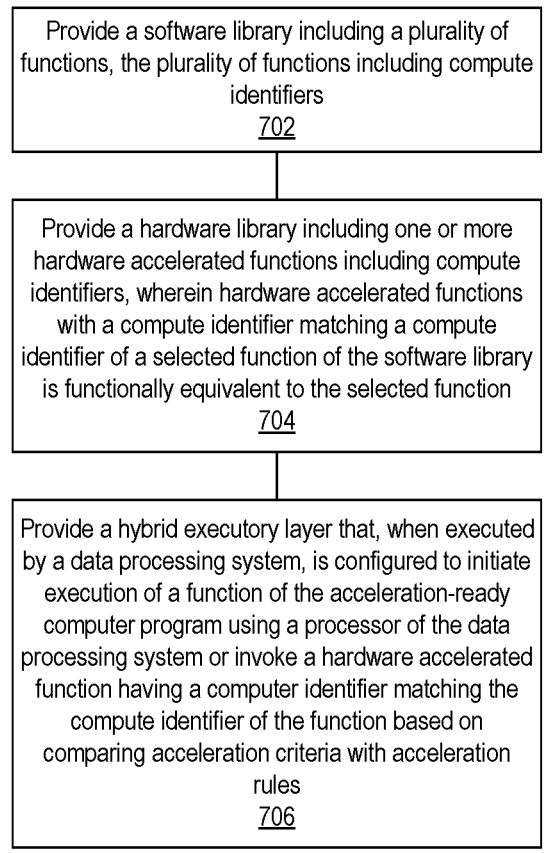
FIG. 7 illustrates an example method of developing an acceleration-ready computer program.

FIG. 7 illustrates an example method of developing an acceleration-ready computer program. The example of FIG. 7 may be performed using a data processing system such as computer 1100 as described herein in connection with FIG. 11.

In block 702, a software library 102 including a plurality of functions where the plurality of functions include compute IDs is provided. For example, a data processing system is capable of storing such a software library and making the software library available to user for purposes of developing a computer program. Each function within the software library includes a compute ID. In one aspect, the compute ID included in each function is unique.

In block 704, a hardware library 104 including one or more hardware accelerated functions also including compute IDs is provided. For example, the data processing system is capable of storing and/or accessing such a hardware library and making the hardware library available when an acceleration-ready computer program built using the software library is executed. It should be appreciated, however, that the hardware library need not be used or even available to the user at the time the acceleration ready computer program is developed and/or built or compiled.

In block 706, a hybrid executor layer 508 may be provided. The hybrid executor layer, when executed by a data processing system with a computer program built using the software library, is configured to initiate execution of a selected function of the acceleration-ready computer program using a processor of the data processing system or invoke a hardware accelerated function having a compute identifier matching the compute identifier of the selected function based on comparing acceleration criteria 510 with acceleration rules 512.

As noted, hybrid executor layer 508 is capable of determining the acceleration criteria 510 and comparing the acceleration criteria 510 with acceleration rules 512. In one aspect, the acceleration criteria 510 may include, but is not limited to, availability of a hardware accelerator in the data processing system. In another aspect, acceleration criteria 510 can include a determination of whether the selected function, e.g., a current function of the acceleration-read computer program being called during execution by the data processing system, has a compute ID.

In another aspect, acceleration criteria 510 can include a determination that the selected function has a compute ID and a hardware accelerated function in the hardware library 104 has a compute ID matching the compute identifier of the selected function.

In another aspect, acceleration criteria 510 can include a determination that the hardware accelerator has space to implement the hardware accelerated function.

In another aspect, acceleration criteria 510 can include one or more time-based measurements. For example, acceleration criteria 510 can include an amount of time required to implement the hardware accelerated function in the hardware accelerator. Acceleration criteria 510 may also include time-based communication overhead. Communication overhead refers to the amount of time needed to transfer data from the data processing system to the hardware accelerator (implementing the hardware accelerated function) and the amount of time needed to transfer data from the hardware accelerator (e.g., as generated by the hardware accelerated function) to the data processing system. The communication overhead may be the sum of these data transfers.

In still another aspect, apart from whether the data processing system includes a hardware accelerator and there is a functionally equivalent hardware accelerated function available for the selected function, hybrid executor layer 508 may perform a comparison of acceleration criteria 510 with accelerator rules 512 to determine whether to hardware accelerate the selected function based on whether performance of the data processing system improves. Performance may include faster operation, performing the function using less power, or both.

In one or more example implementations, acceleration criteria 510 may be computed dynamically at or during runtime. In one or more other example implementations, acceleration criteria 510 may be precomputed for the functions, e.g., on a per function basis, for the particular data processing system to be used at runtime. Acceleration criteria 510 may also include a combination of data computed dynamically at or during runtime and precomputed data. In any case, the availability of precomputed acceleration criteria 510 may increase the speed and/or performance of hybrid executor layer 508.

Figure 8:
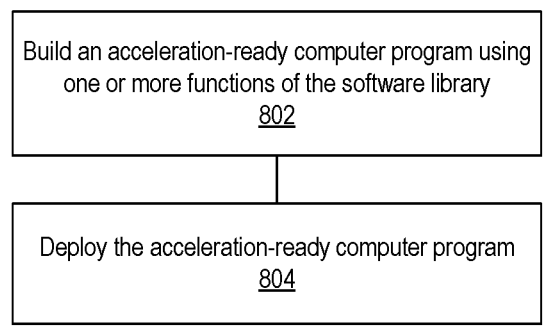
FIG. 8 illustrates another example method of implementing an acceleration-ready computer program.

FIG. 8 illustrates another example method of implementing an acceleration-ready computer program. The example of FIG. 8 may be performed using a data processing system such as computer 1100 as described herein in connection with FIG. 11.

In block 802, the acceleration-ready computer program is built using one or more functions of the software library. For example, the user may write or create a computer program that includes one or more of the functions of the software library. The computer-based implementation tool may then be used to compile and/or link the computer program to create an acceleration-ready computer program 112 (e.g., linked object code). In block 804, the acceleration-ready computer program may be deployed. For example, the acceleration ready computer program may be installed on a user data processing system, in a computer in a data center, or the like. The data processing system in which the acceleration-ready computer program is installed may or may not have a hardware accelerator.

Figure 9:
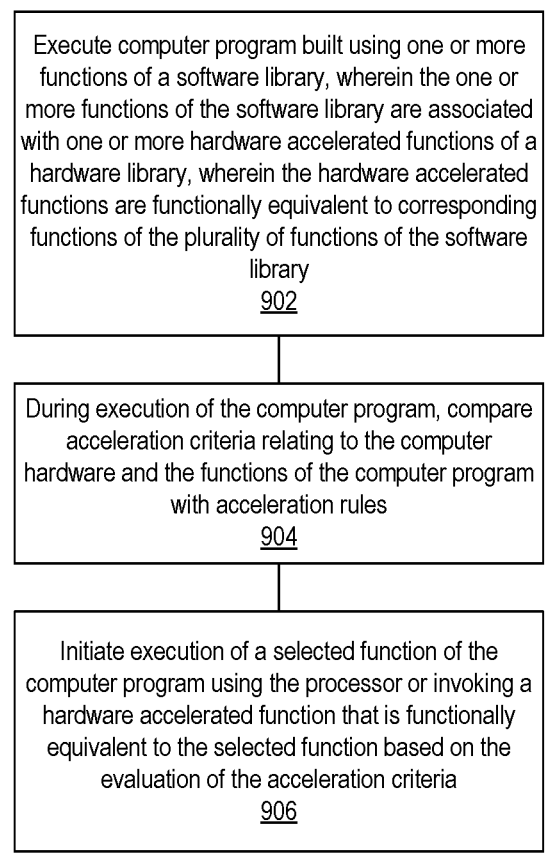
FIG. 9 illustrates an example method of execution of an acceleration-ready program by a data processing system.

FIG. 9 illustrates an example method of execution of an acceleration-ready program by a data processing system. The example of FIG. 9 may be performed using a data processing system such as computer 1100 as described herein in connection with FIG. 11. The data processing system may or may not have a hardware accelerator.

In block 902, an acceleration-ready computer program 112 built using one or more functions of software library 102 may be executed. One or more functions of software library 102 are associated with one or more hardware accelerated functions of hardware library 104, wherein the hardware accelerated functions are functionally equivalent to corresponding functions of the plurality of functions of the software library 102. In block 904, during execution of the computer program (e.g., in real-time), the processor of the data processing system (by way of executing hybrid executor layer 508) compares acceleration criteria 510 relating to the computer hardware and the functions of the computer program with acceleration rules 512. In block 906, execution of a selected function of the acceleration-ready computer program 112 is initiated using the processor or a hardware accelerated function that is functionally equivalent to the selected function is invoked based on the comparing.

In one aspect, the comparing includes determining, using the processor, availability of a hardware accelerator for hardware accelerating the selected function.

In another aspect, the execution of the selected function of the acceleration-ready computer program by the processor may be initiated (e.g., by hybrid executor layer 508) in response to determining that a hardware accelerator is not available.

In another aspect, the comparing includes determining whether the selected function has a compute identifier. For example, hybrid executor layer 508 is capable of intercepting a function call to the function and determining whether the function includes a compute ID. In one aspect, hybrid executor layer 508 determines whether the function has a compute ID by consulting a task graph for the acceleration-ready computer program.

In another aspect, the comparing can include, in response to determining that the selected function has a compute ID, determining whether a hardware acceleration library includes a hardware accelerated function having a compute ID matching the compute identifier of the selected function.

Figure 10:
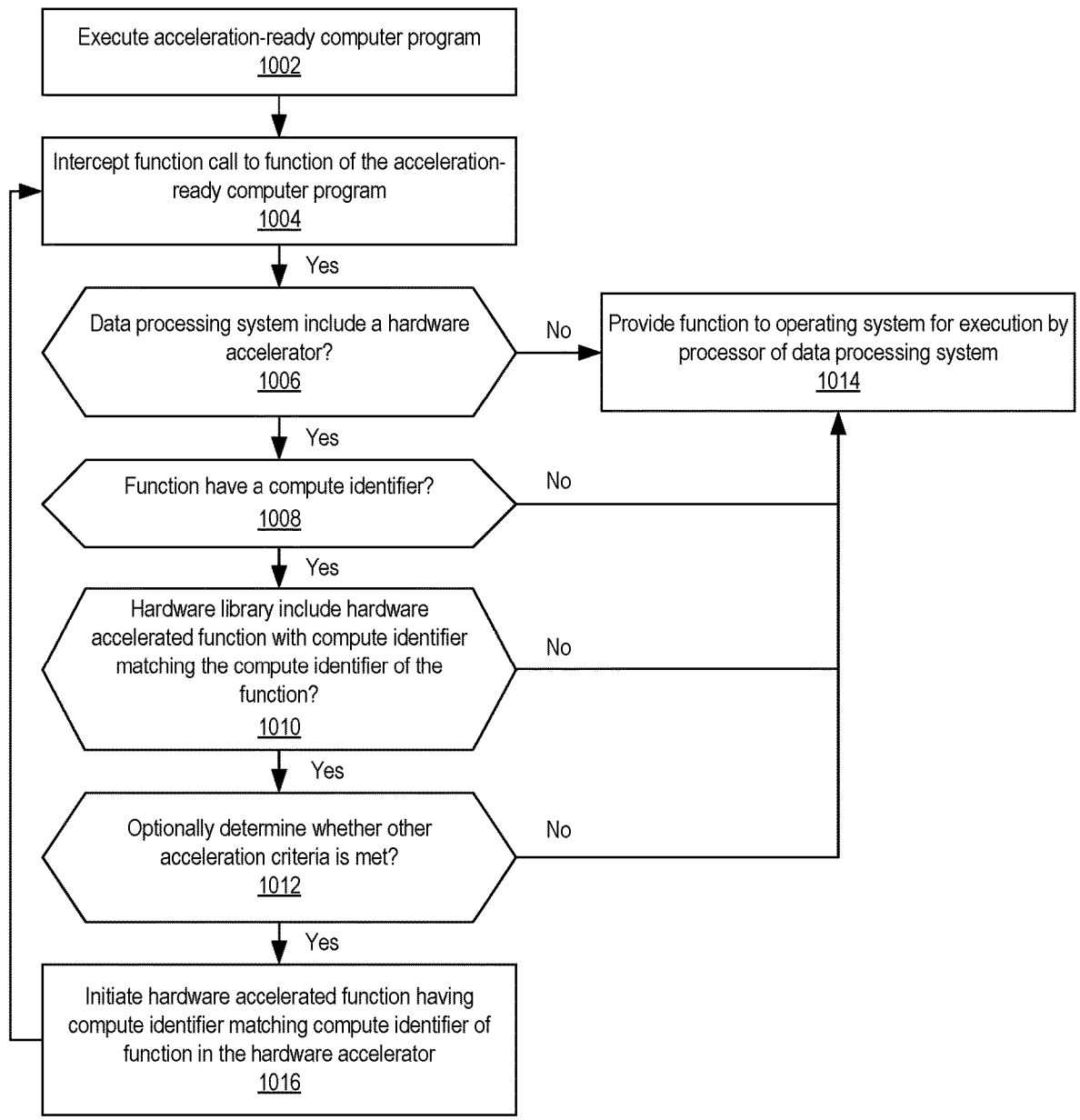
FIG. 10 illustrates another example method of execution of an acceleration-ready program by a data processing system.

FIG. 10 illustrates another example method of execution of an acceleration-ready program by a data processing system. FIG. 10 illustrates certain operative features of executing an acceleration-ready computer program in greater detail as may be performed by a data processing system such as computer 1100 of FIG. 11.

In block 1002, the data processing system executes the acceleration-ready computer program. In block 1004, a function call to a function (e.g., the "current function") of the acceleration-ready computer program is intercepted. The hybrid executor layer, for example, may be configured to intercept function calls of the acceleration-ready computer program.

Blocks 1006, 1008, 1010, and 1012 illustrate different examples of the hybrid executor layer determining acceleration criteria and comparing the acceleration criteria with acceleration rules. In block 1006, the hybrid executor layer determines whether the data processing system includes, or is able to access, a hardware accelerator. The data processing system may include, or store, one or more parameters that indicate whether a hardware accelerator has been installed and is available. The hybrid executor layer, for example, may query the operating system to determine whether a hardware accelerator is installed in the data processing system. In another aspect, the hybrid executor layer may determine whether the hardware accelerator runtime has been installed and/or query the hardware accelerator runtime to determine whether hardware accelerator has been installed.

In response to determining that a hardware accelerator is not installed (e.g., is not available), the method continues to block 1014. In block 1014, the hybrid executor layer provides the function corresponding to the intercepted function call to the operation system for execution by the processor of the data processing system. In one aspect, the hybrid executor provides the function to a scheduler, e.g., a thread scheduler of the operating system. In any case, the processor, in response, executes the function.

In response to determining that a hardware accelerator is installed in the data processing system, the method continues to block 1008. In block 1008, the hybrid executor layer determines whether the current function includes or has a compute ID. In response to determining that the function does not include or have a compute ID, the method continues to block 1014 where the processor executes the function. A function that does not have a compute ID is a function that is not from software library 102 and is considered to have no functional equivalent hardware accelerated function.

In response to determining that the function does have a compute ID, the method continues to block 1010. In block 1010, the hybrid executor determines whether the hardware library includes a hardware accelerated function with a compute ID that matches the compute ID of the function. In response to determining that the hardware library does not have a hardware accelerated function with a compute ID matching the compute ID of the function (e.g., a matching hardware accelerated function), the method continues to block 1014 where the processor executes the function.

In response to determining that the hardware library does have a hardware accelerated function with a compute ID matching the compute ID of the function, the method continues to block 1012. In block 1012, the hybrid executor layer optionally determines one or more other acceleration criteria and compares the acceleration criteria to the acceleration rules. If such other acceleration criteria conform to the acceleration rules, the method proceeds to block 1016. If such other acceleration criteria do not conform to the acceleration rules, the method continues to block 1014 where the processor executes the function.

An example of other acceleration criteria that may be evaluated by the hybrid executor layer can include, but is not limited to, whether the IC on the hardware accelerator has sufficient available space to implement (e.g., load) the hardware accelerated function therein. The IC, for example, may be executing one or more other hardware accelerated functions and may lack the available space to implement a further hardware accelerated function therein. The hybrid executor layer is capable of communicating with the hardware accelerator runtime to determine the state of the IC on the hardware accelerator and determine the available space therein for implementing further hardware accelerated functions. The hybrid accelerator may compare the available space in the IC with metadata corresponding to the matched hardware accelerated function (e.g., the size of the matched hardware accelerated function) to determine whether the IC has sufficient space.

Another example of other acceleration criteria that may be evaluated by the hybrid executor layer can include, but is not limited to, the time needed for the hardware accelerated function to perform or complete the function compared to the time needed to execute the function using a processor. The time for the matched hardware accelerated function to complete execution may include the time needed to load the matched hardware accelerated function on the IC if not already loaded thereon, time to transfer data to and from the hardware accelerator, and/or the time needed for the matched hardware accelerated function to complete execution. Data such as the amount of time to load the matched hardware accelerated function, time to transfer data, and/or the time for the accelerated function to complete execution may be stored as metadata for the matched hardware accelerated function within the hardware library. The hybrid executor is capable of comparing the metadata with a known execution time of the function by the processor to determine whether to allow the processor to execute the function or invoke the hardware accelerator.

In another aspect, the hybrid executor layer is capable of determining the type of hardware of the data processing system. For example, the hybrid executor layer may determine the type of processor included in the data processing system that would be used to execute the function, available memory, and the like. Such additional data may be used as additional factors when making time determinations as more powerful processors will, in general, require less time to execute a function compared to a less powerful processor. This information may be included in the determination of whether to allow the processor to execute the function or invoke the matched hardware accelerated function using the hardware accelerator. For example, the acceleration rules may indicate that certain processor models or types may be used to execute certain functions while others are not. The acceleration rules may include factors to be used to modify timing data based on the hardware involved (e.g., the time to perform function X should be extended by Y for a given processor type or reduced by Z for another given processor type).

In another aspect, the hybrid executor layer is capable of determining data dependencies of the current function. For example, if the current function uses, as input, data that is output from another function that was invoked as a hardware accelerated function on the hardware accelerator, the hybrid executor layer may determine that, the current function should be invoked as a hardware accelerated function on the hardware accelerator for purposes of efficiency (e.g., data transfer between the functions). In such cases, the data transfer time may become effectively zero. Similarly, if the current function outputs data that is used as an input by another function that was invoked as a hardware accelerated function on the hardware accelerator, the hybrid executor layer may determine that, the current function should be invoked as a hardware accelerated function on the hardware accelerator for purposes of efficiency (e.g., data transfer between the functions). If one or both of such data dependencies exist, the hybrid executor may choose to invoke the current function on as a hardware accelerated function on the hardware accelerator.

In another aspect, if the dependencies indicate that the function providing data to the current function is executing in the processor and/or the function that receives data generated by the current function is executing in the processor, the hybrid executor layer may determine that the current function should be executed by the processor also.

Though illustrated as being performed serially, in other example implementations, it should be appreciated that blocks 1006, 1008, 1010, and/or 1012 or any combination of the foregoing may be performed concurrently or in a different order that shown. Those operations that are performed using and/or based on time (e.g., to load a particular hardware accelerated function in the hardware accelerator and/or time to transfer data to and from the hardware accelerator) and the amount of space available on the hardware accelerator may be performed once a particular hardware accelerated function is determined in order to obtain the relevant time and/or size metrics of the hardware accelerated function needed for the determinations. Similarly, those operations that determine whether a hardware accelerated function has a compute ID matching a compute ID of a selected function of the acceleration-ready computer program may also be performed once a determination is made that the selected function has a compute ID and determining what the compute ID is.

In block 1016, the hybrid executor layer initiates the hardware accelerated function having a compute ID matching the compute ID of the current function in the hardware accelerator. In one aspect, initiating the hardware accelerated function may include providing data from the data processing system to the hardware accelerator (e.g., the input arguments) and starting operation of the hardware accelerated function therein. In another aspect, initiating the hardware accelerated function also may include loading (e.g., implementing) the hardware accelerated function in the IC of the hardware accelerated function. The data processing system further may retrieve results of execution of the hardware accelerated function.

The examples described within this disclosure illustrate that the particular portions of an acceleration-ready computer program that are executed by a processor and that are hardware accelerated using a hardware accelerator may change over time based on the state of the data processing system, the presence or absence of a hardware accelerator, and various other factors in real-time. This is accomplished without modifying or altering the acceleration-ready computer program after installation on a user system. A hardware accelerator may be added to the data processing system, removed from the data processing system, and/or replaced by a different hardware accelerator (e.g., a more powerful hardware accelerator) in which the acceleration-ready computer program is installed post installation of the acceleration-ready computer program and the acceleration-ready computer program is still able to execute without modification.

Figure 11:
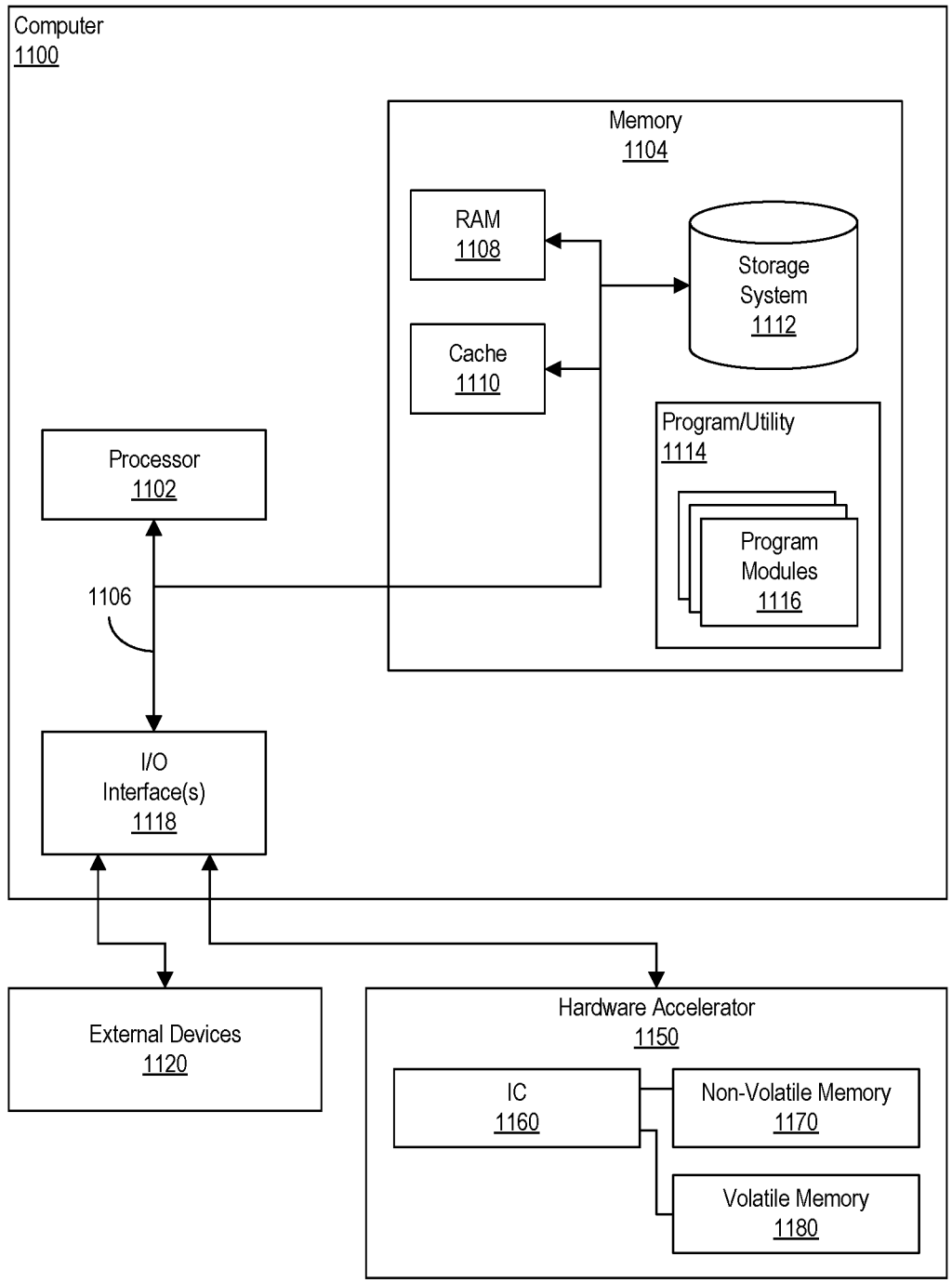
FIG. 11 illustrates an example implementation of a computer.

FIG. 11 illustrates an example implementation of a computer 1100. Computer 1100 is an example of a data processing system, as described herein, that is capable of executing an acceleration-ready computer program and that may include an optional hardware accelerator. For purposes of illustration, a single hardware accelerator is illustrated. It should be appreciated that more than one hardware accelerator may be included and used with the example implementations described herein.

The components of computer 1100 can include, but are not limited to, a processor 1102, a memory 1104, and a bus 1106 that couples various system components including memory 1104 to processor 1102. Processor 1102 may be implemented as one or more processors. In an example, processor 1102 is implemented as a central processing unit (CPU). Example processor types include, but are not limited to, processors having an x86 type of architecture (IA-32, IA-64, etc.), Power Architecture, ARM processors, and the like.

Bus 1106 represents one or more of any of a variety of communication bus structures. By way of example, and not limitation, bus 1106 may be implemented as a Peripheral Component Interconnect Express (PCIe) bus. Computer 1100 typically includes a variety of computer system readable media. Such media may include computer-readable volatile and non-volatile media and computer-readable removable and non-removable media.

In the example of FIG. 11, computer 1100 includes memory 1104. Memory 1104 can include computer-readable media in the form of volatile memory, such as random-access memory (RAM) 1108 and/or cache memory 1110. Computer 1100 also can include other removable/non-removable, volatile/non-volatile computer storage media. By way of example, storage system 1112 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1106 by one or more data media interfaces. Memory 1104 is an example of at least one computer program product.

Program/utility 1114, having a set (at least one) of program modules 1116, may be stored in memory 1104. By way of example, program modules 1116 may represent an operating system, one or more application programs, other program modules, and program data. Program modules 1116 generally carry out the functions and/or methodologies of the example implementations described within this disclosure. For example, one or more of program modules 1116 can implement software library 102, hardware library 104, implementation tools 106, acceleration-ready computer program 112, operating system 502, hybrid executor layer 508, hardware accelerator runtime 506, and/or one or more other computer program that are not acceleration-ready.

Program/utility 1114 is executable by processor 1102. Program/utility 1114 and any data items used, generated, and/or operated upon by computer 1100 are functional data structures that impart functionality when employed by computer 1100.

Computer 1100 may include one or more Input/Output (I/O) interfaces 1118 communicatively linked to bus 1106. I/O interface(s) 1118 allow computer 1100 to communicate with one or more external devices 1120 and/or communicate over one or more networks such as a local area network (LAN), a wide area network (WAN), and/or a public network (e.g., the Internet). Examples of I/O interfaces 1118 may include, but are not limited to, network cards, modems, network adapters, hardware controllers, etc. Examples of external devices 1120 also may include a display and/or other devices such as a keyboard and/or a pointing device that enable a user to interact with computer 1100.

Computer 1100 may be coupled to a hardware accelerator 1150 via I/O interface 1118. In one aspect, hardware accelerator is implemented as a circuit board, e.g., a card, to which one or more components may be attached or disposed. As a non-limiting example, hardware accelerator 1150 may be implemented as a card that may be inserted into an available bus and/or card (e.g., PCIe) slot of computer 1100. In some computing architectures, I/O devices may connect directly to hardware accelerator 1150. In such architectures, a hardware accelerated function may efficiently use and/or receive input and produce output through the I/O devices without intervention from processor 1102. In still other example architectures, hardware accelerator 1150 may be integrated more closely with processor 1102 such that communications between processor 1102 and hardware accelerator 1150 do not flow through I/O device 1118. In some architectures, for example, processor 1102 may be equipped with a hardware accelerator in the same package. Some devices, for example, include a processor coupled to programmable circuitry. Hybrid executor layer 508 is capable of managing multiple accelerators whether such accelerators are in the same package as processor 1102 or not.

Hardware accelerator 1150 includes an IC 1160. IC 1160 may be implemented as any of a variety of ICs including, but not limited to, a graphics processing unit (GPU), a digital signal processor (DSP), a programmable IC, and/or a System-on-Chip (SoC). A programmable IC includes at least some programmable circuitry and may or may not include other hardwired circuits. Programmable logic is an example of programmable circuitry. An example of a programmable IC includes a Field Programmable Gate Array (FPGA).

Hardware accelerator 1150 may include volatile memory 1170 coupled to IC 1160 and a non-volatile memory 1180 coupled to IC 1160. Volatile memory 1170 may be implemented as a RAM. In the example of FIG. 11, volatile memory 1170 is external to IC 1160, but still may be considered a "local memory" of IC 1160, whereas memory 1104, being within computer 1100, is not considered local to IC 1160. Non-volatile memory 1180 may be implemented as flash memory. Non-volatile memory 1180 is also external to IC 1160 and may be considered local to IC 1160. In other example implementations, IC 1160 may include internal memory in addition to volatile memory 1170 or in lieu of volatile memory 1170.

Hardware accelerator 1150 usually provides improved performance compared to executing an application using processor 1102. For a device such as a programmable IC, the application is compiled into a circuit design that is implemented within IC 1160, thereby physically implementing the application as hardware within IC 1160. The circuitry implementing the application typically provides one or more benefits that are not attainable through execution of the compiled application using a processor. The benefit(s) may be faster operation, reduced power consumption, redundancy, increased throughput, and/or reduced latency, etc.

Computer 1100 is only one example implementation of a computer. Computer 1100 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices. The example of FIG. 11 is not intended to suggest any limitation as to the scope of use or functionality of example implementations described herein. Computer 1100 is an example of a data processing system and/or computer hardware that is capable of performing the various operations described within this disclosure.

In this regard, computer 1100 may include fewer components than shown or additional components not illustrated in FIG. 11 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computer 1100 may be operational with numerous other general-purpose or special-purpose computing system environments or configurations. Examples of computing systems, environments, and/or configurations that may be suitable for use with computer 1100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Some computing environments, e.g., cloud computing environments and/or edge computing environments using computer 1100 or other suitable data processing system, generally support the FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of NIST.

Figure 12:
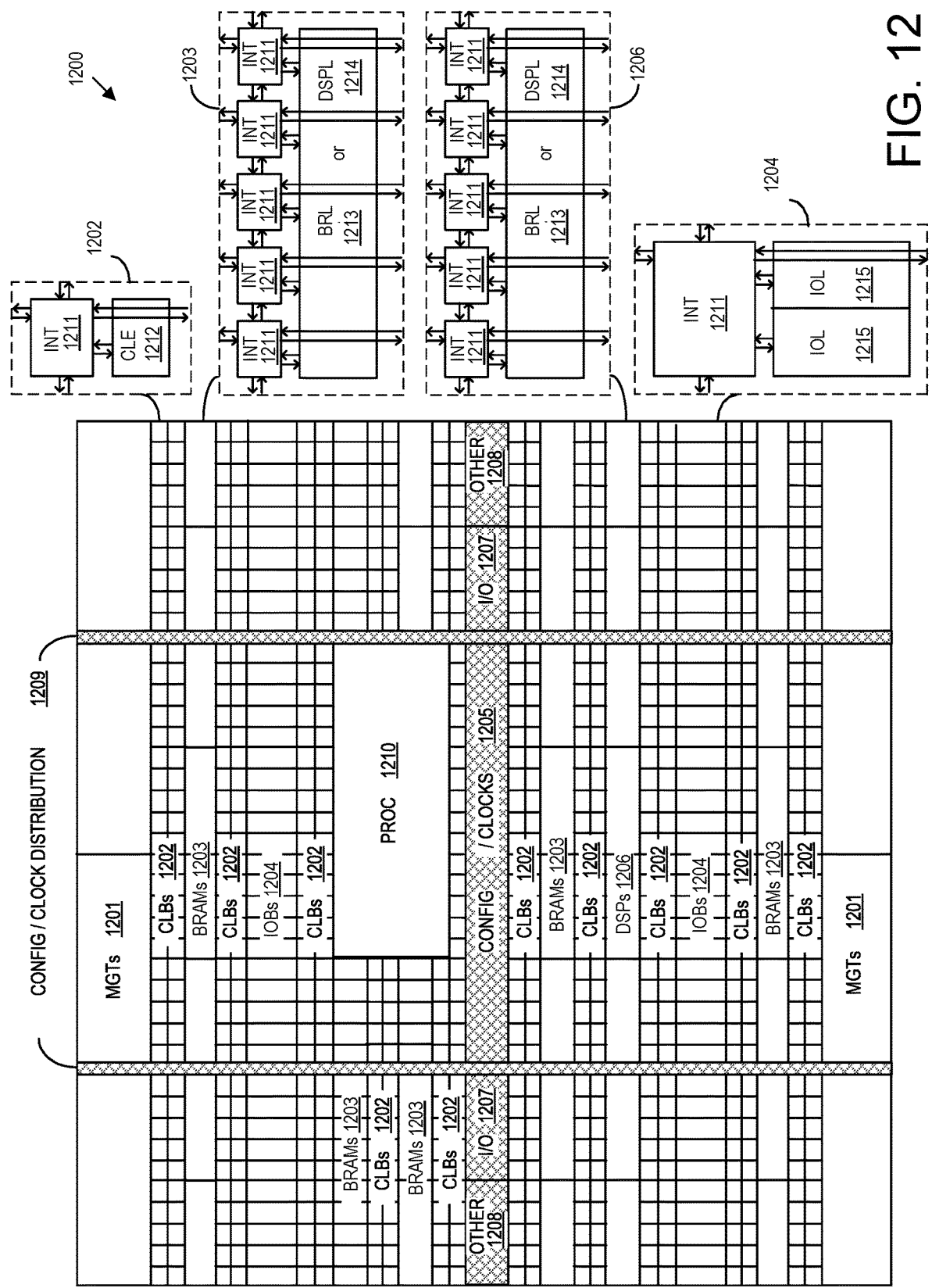
FIG. 12 illustrates an example architecture for an integrated circuit (IC).

FIG. 12 illustrates an example architecture 1200 for an IC. Architecture 1200 may be used to implement IC 1160 of FIG. 11. In one aspect, architecture 1200 may be implemented within a programmable IC. A programmable IC is an IC with at least some programmable circuitry. Programmable circuitry may include programmable logic. For example, architecture 1200 may be used to implement a FPGA. Architecture 1200 may also be representative of an SoC type of IC. An example of an SoC is an IC that includes a processor that executes program code and one or more other circuits. The other circuits may be implemented as hardwired circuitry, programmable circuitry, and/or a combination thereof. The circuits may operate cooperatively with one another and/or with the processor. In one aspect, a data processing system including a processor, memory, and hardware accelerator (e.g., as realized or implemented by programmable circuitry) may be realized using an IC having an architecture the same as or similar to that of FIG. 12.

As shown, architecture 1200 includes several different types of programmable circuit, e.g., logic, blocks. For example, architecture 1200 may include a large number of different programmable tiles including multi-gigabit transceivers (MGTs) 1201, configurable logic blocks (CLBs) 1202, random-access memory blocks (BRAMs) 1203, input/output blocks (IOBs) 1204, configuration and clocking logic (CONFIG/CLOCKS) 1205, digital signal processing blocks (DSPs) 1206, specialized I/O blocks 1207 (e.g., configuration ports and clock ports), and other programmable logic 1208 such as digital clock managers, analog-to-digital converters, system monitoring logic, and so forth.

In some ICs, each programmable tile includes a programmable interconnect element (INT) 1211 having standardized connections to and from a corresponding INT 1211 in each adjacent tile. Therefore, INTs 1211, taken together, implement the programmable interconnect structure for the illustrated IC. Each INT 1211 also includes the connections to and from the programmable logic element within the same tile, as shown by the examples included at the right of FIG. 12.

For example, a CLB 1202 may include a configurable logic element (CLE) 1212 that may be programmed to implement user logic plus a single INT 1211. A BRAM 1203 may include a BRAM logic element (BRL) 1213 in addition to one or more INTs 1211. Typically, the number of INTs 1211 included in a tile depends on the height of the tile. As pictured, a BRAM tile has the same height as five CLBs, but other numbers (e.g., four) also may be used. A DSP tile 1206 may include a DSP logic element (DSPL) 1214 in addition to an appropriate number of INTs 1211. An 10B 1204 may include, for example, two instances of an I/O logic element (IOL) 1215 in addition to one instance of an INT 1211. The actual I/O pads connected to IOL 1215 may not be confined to the area of IOL 1215.

In the example pictured in FIG. 12, the shaded area near the center of the die, e.g., formed of regions 1205, 1207, and 1208, may be used for configuration, clock, and other control logic. Shaded areas 1209 may be used to distribute the clocks and configuration signals across the breadth of the programmable IC.

Some ICs utilizing the architecture illustrated in FIG. 12 include additional logic blocks that disrupt the regular columnar structure making up a large part of the IC. The additional logic blocks may be programmable blocks and/or dedicated circuitry. For example, a processor block depicted as PROC 1210 spans several columns of CLBs and BRAMs.

In one aspect, PROC 1210 may be implemented as dedicated circuitry, e.g., as a hardwired processor, that is fabricated as part of the die that implements the programmable circuitry of the IC. PROC 1210 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1210 may be omitted from architecture 1200 and replaced with one or more of the other varieties of the programmable blocks described. Further, such blocks may be utilized to form a "soft processor" in that the various blocks of programmable circuitry may be used to form a processor that can execute program code as is the case with PROC 1210.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 12 that are external to PROC 1210 such as CLBs 1202 and BRAMs 1203 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1210.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 1210 or a soft processor. In some cases, architecture 1200 includes a dedicated configuration processor that loads the configuration bitstream to the appropriate configuration memory and/or processor memory. The dedicated configuration processor does not execute user-specified program code. In other cases, architecture 1200 may utilize PROC 1210 to receive the configuration bitstream, load the configuration bitstream into appropriate configuration memory, and/or extract program code for execution.

FIG. 12 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 12 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1210 within the IC are for purposes of illustration only and are not intended as limitations.

Figure 13:
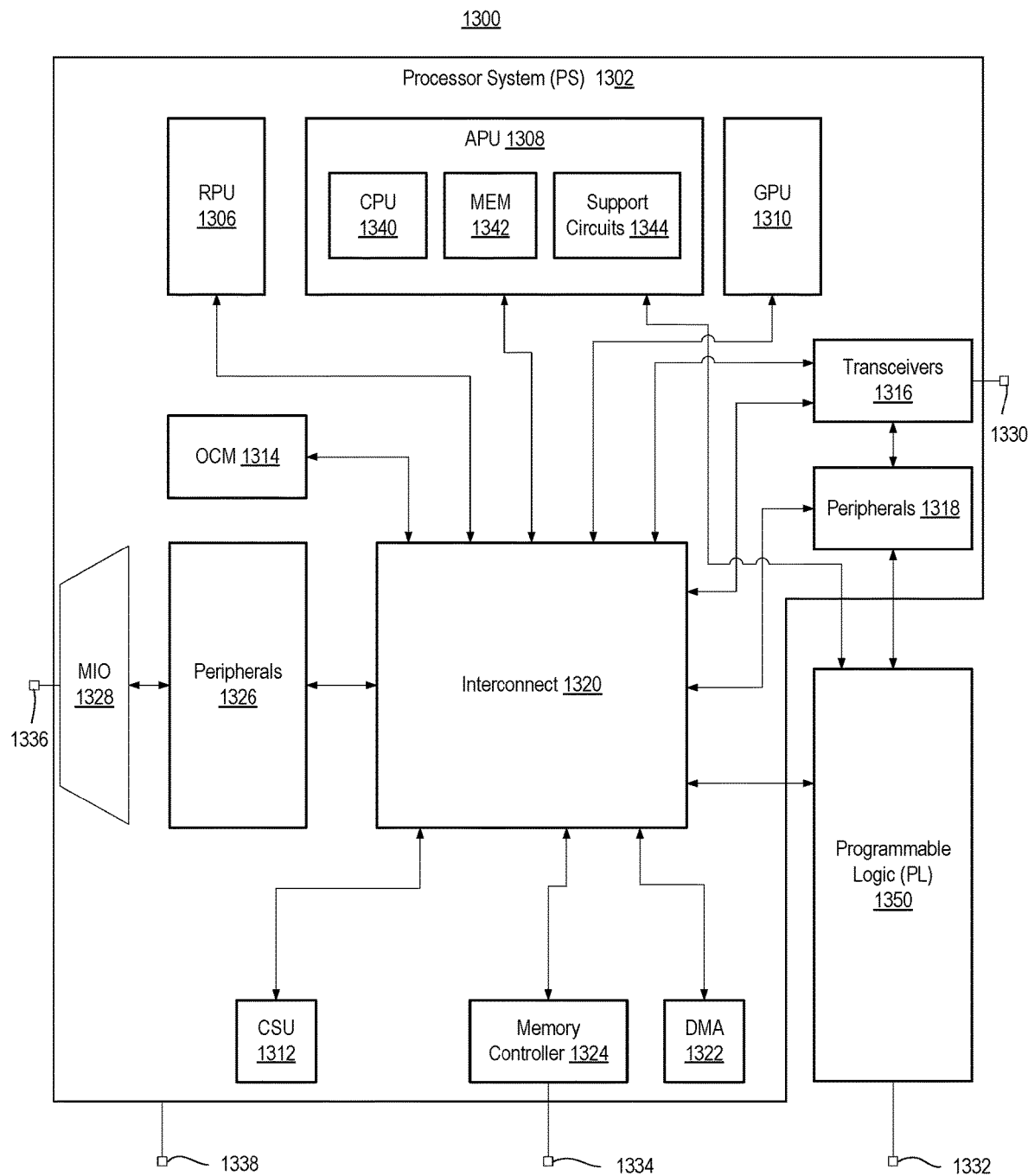
FIG. 13 illustrates an example architecture for a device.

FIG. 13 illustrates an example architecture for a device 1300. Device 1300 is an example of an SoC type of IC. Device 1300 may be used to implement a data processing system with integrated hardware acceleration. In the example of FIG. 13, device 1300 is implemented on a single die provided within a single package. In other examples, device 1300 may be implemented using a plurality of interconnected dies within a single package where the various resources of device 1300 (e.g., circuits) illustrated in FIG. 13 are implemented across the different interconnected dies. Device 1300 may include one or more different types of subsystems.

In the example, device 1300 includes a processor system (PS) 1302. While described as a "system," PS 1302 is an example of a subsystem of device 1302. In general, PS 1302 is implemented as hardwired circuitry that is fabricated as part of device 1300. PS 1302 may be implemented as, or include, any of a variety of different processor types each capable of executing program code. The processors may have different architectures and/or instruction sets.

In the example, PS 1302 includes various processors such as a real-time processing unit (RPU) 1306, an application processing unit (APU) 1308, a graphics processing unit (GPU) 1310, a configuration and security unit (CSU) 1312, and the like. Each of the processors is capable of executing program code.

PS 1302 also includes various support circuits, such as on-chip memory (OCM) 1314, transceivers 1316, peripherals 1318, interconnect 1320, DMA circuit 1322, memory controller 1324, peripherals 1326, and multiplexed input/output (MIO) circuit 1328. The processors and the support circuits are interconnected by interconnect 1320.

Transceivers 1316 may be coupled to external pins 1330. Programmable logic 1350, to be described in greater detail below, may be coupled to external pins 1332. Memory controller 1320 may be coupled to external pins 1334. MIO 1328 may be coupled to external pins 1336. PS 1302 may be coupled to external pins 1338. APU 1308 can include a CPU 1340, memory 1342, and support circuits 1344.

In the example of FIG. 13, each of processors 1306, 1308, and 1310 may include one or more central processing units (CPUs) and associated circuits, such as memories, interrupt controllers, direct memory access (DMA) controllers, memory management units (MMUs), floating point units (FPUs), and the like. Interconnect 1320 includes various switches, busses, communication links, and the like configured to interconnect processors 1306, 1308, 1310 and to interconnect the other components in PS 1302 to processors 1306, 1308, and 1310.

OCM 1314 includes one or more RAM modules, which can be distributed throughout PS 1302. For example, OCM 1314 can include battery backed RAM (BBRAM), tightly coupled memory (TCM), and the like. Memory controller 1324 can include a dynamic random access memory (DRAM) interface for accessing external DRAM. Peripherals 1318, 1326 can include one or more components that provide an interface to PS 106. For example, peripherals 1322 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose 10 (GPIO) ports, serial advanced technology attachment (SATA) ports, PCIe ports, and the like. Peripherals 1326 can be coupled to MIO 1328. Peripherals 1318 can be coupled to transceivers 1316. Transceivers 1316 can include serializer/deserializer (SERDES) circuits, MGTs, and the like.

In the example of FIG. 13, device 1300 optionally includes programmable logic 1350 subsystem. Programmable logic 1350 is circuitry that may be programmed to perform specified functions. As an example, programmable logic 1350 may be implemented as field programmable gate array type of circuitry. Programmable logic 1350 can include an array of programmable circuit blocks. The term "programmable logic" refers to circuitry used to build reconfigurable digital circuits. Programmable logic may be formed of many programmable circuit blocks that provide basic functionality.

In the example of FIG. 13, programmable logic 1350 may be coupled to interconnect 1320. The topology of programmable logic 1350 is highly configurable unlike hardwired circuitry. Each programmable circuit block of programmable logic 1350 typically includes a programmable element (e.g., a functional element) and a programmable interconnect. The programmable interconnects provide the highly configurable topology of programmable logic 1350. The programmable interconnects may be configured on a per wire basis to provide connectivity among the programmable elements of programmable circuit blocks of programmable logic 1350 and is configurable on a per-bit basis (e.g., where each wire conveys a single bit of information) unlike packet-based communications, for example.

Examples of programmable circuit blocks of programmable logic 1350 include configurable logic blocks having look-up tables and registers. Unlike hardwired circuitry, these programmable circuit blocks have an undefined function at the time of manufacture. Programmable logic 1350 may include other types of programmable circuit blocks that also provide basic and defined functionality with more limited programmability. Examples of these circuit blocks may include digital signal processing blocks (DSPs), phase lock loops (PLLs), and block random access memories (BRAMs). These types of programmable circuit blocks, like others in programmable logic 1350, are numerous and intermingled with the other programmable circuit blocks of programmable logic 1350. These circuit blocks may also have an architecture that generally includes a programmable interconnect and a programmable element and, as such, are part of the highly configurable topology of programmable logic 1350.

Device 1300 may include one or more other subsystems including a processor array (e.g., a data processing engine (DPE) array), a Network-on-Chip (NoC), a platform management controller (PMC), and one or more hardwired circuit blocks. Examples of hardwired circuit blocks may include input/output (I/O) blocks, transceivers for sending and receiving signals to circuits and/or systems external to device 1300, memory controllers, or the like. Examples of different I/O blocks may include single-ended and pseudo differential I/Os. Examples of transceivers may include high-speed differentially clocked transceivers. Other examples of hardwired circuit blocks include, but are not limited to, cryptographic engines, digital-to-analog converters (DACs), analog-to-digital converters (ADCs), and the like. In general, hardwired circuit blocks are application-specific circuit blocks.

The programmable logic 1350 may be used to implement a hardware accelerator. The hardware accelerator may also make use of or include one or more hardwired circuit blocks.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "real-time" means a level of processing responsiveness that a user or system senses as sufficiently immediate for a particular process or determination to be made, or that enables the processor to keep up with some external process.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "data processing system" means one or more hardware systems configured to process data, each hardware system including at least one processor programmed to initiate operations and memory.

As defined herein, the term "processor" means at least one circuit capable of carrying out instructions contained in program code. The circuit may be an integrated circuit or embedded in an integrated circuit.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:
providing a software library having a plurality of functions having compute identifiers;
wherein the software library is associated with a hardware library including one or more hardware accelerated functions, wherein the hardware accelerated functions are associated with the compute identifiers, and each hardware accelerated function is a functional equivalent of a function of the software library having the same compute identifier; and
providing a hybrid executor layer that, when executed by a data processing system with an acceleration-ready computer program built using the software library, is configured to initiate execution of a selected function of the acceleration-ready computer program using a processor of the data processing system or invoke a selected hardware accelerated function of the hardware library having a compute identifier matching the compute identifier of the selected function based on comparing acceleration criteria with acceleration rules;
wherein the comparing includes determining that the selected function has a compute identifier, determining that the selected hardware accelerated function has a compute identifier matching the compute identifier of the selected function, and determining an amount of time required to load the selected hardware accelerated function in a hardware accelerator.

2. The method of claim 1, wherein the comparing includes determining availability of the hardware accelerator in the data processing system.

3. The method of claim 1, wherein the comparing includes determining whether speed of operation improves by invoking the selected hardware acceleration function in lieu of the selected function.

4. The method of claim 1, wherein the comparing includes determining whether power consumption improves by invoking the selected hardware acceleration function in lieu of the selected function.

5. The method of claim 1, wherein the comparing includes determining that the hardware accelerator has space to implement the selected hardware accelerated function.

6. The method of claim 1, wherein the acceleration criteria include a type of the processor included in the data processing system.

7. A method, comprising:
executing, using computer hardware, a computer program built using one or more functions of a software library;
wherein the one or more functions of the software library are associated with one or more hardware accelerated functions of a hardware library, wherein the hardware accelerated functions are functionally equivalent to corresponding ones of the one or more functions of the software library;
during execution of the computer program, comparing, using the computer hardware, acceleration criteria relating to the computer hardware and the functions of the computer program with acceleration rules; and
initiating execution of a selected function of the computer program using a processor of the computer hardware or invoking a selected hardware accelerated function of the hardware library that is functionally equivalent to the selected function based on the comparing;
wherein the comparing includes, in response to determining that the selected function has a compute identifier, determining whether the selected hardware accelerated function has a compute identifier matching the compute identifier of the selected function and determining an amount of time required to load the selected hardware accelerated function in a hardware accelerator.

8. The method of claim 7, wherein the comparing includes determining availability of the hardware accelerator for hardware accelerating the selected function.

9. The method of claim 7, further comprising:
initiating execution of the selected function of the computer program using the processor in response to determining that the hardware accelerator is not available.

10. The method of claim 7, wherein the comparing includes determining whether the selected function has a compute identifier.

11. The method of claim 7, further comprising:
initiating execution of the selected function of the computer program using the processor in response to determining that the selected function does not have a compute identifier.

12. The method of claim 7, wherein
the acceleration criteria include a type of the processor.

13. The method of claim 7, wherein the comparing includes determining whether at least one of speed of operation or power consumption improves by invoking the selected hardware acceleration function in lieu of the selected function.

14. The method of claim 7, wherein the comparing includes:
determining an amount of space needed to implement the selected hardware accelerated function within the hardware accelerator.

15. A system, comprising:
one or more processors configured to implement operations including:
executing a computer program built using one or more functions of a software library;
wherein the one or more functions of the software library are associated with one or more hardware accelerated functions of a hardware library, wherein the hardware accelerated functions are functionally equivalent to corresponding ones of the one or more functions of the software library;
during execution of the computer program, comparing acceleration criteria relating to computer hardware of the system and the functions of the computer program with acceleration rules; and
executing a selected function of the computer program using the one or more processors or invoking a selected hardware accelerated function of the hardware library that is functionally equivalent to the selected function based on the comparing;
wherein the comparing includes determining that the selected function has a compute identifier, determining that the selected hardware accelerated function has a compute identifier matching the compute identifier of the selected function, and determining an amount of time required to load the selected hardware accelerated function in a hardware accelerator.

16. The system of claim 15, wherein the comparing includes determining availability of the hardware accelerator for hardware accelerating the selected function.

17. The system of claim 15, wherein the one or more processors are configured to implement operations further comprising:
initiating execution of the selected function of the computer program using the one or more processors in response to determining that the hardware accelerator is not available.

18. The system of claim 15, wherein the comparing includes determining whether the hardware accelerator has space to implement the selected hardware accelerated function by comparing metadata specifying a size of the selected hardware accelerated function with available space within the hardware accelerator.

19. The system of claim 15, wherein the acceleration criteria include a type of the one or more processors.

* * * * *